(12) United States Patent
Wickenkamp

(10) Patent No.: US 9,264,656 B2
(45) Date of Patent: Feb. 16, 2016

(54) SYSTEMS AND METHODS FOR MANAGING STORAGE SPACE

(71) Applicant: United Video Properties, Inc., Santa Clara, CA (US)

(72) Inventor: Vanessa Wickenkamp, Elmhurst, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 178 days.

(21) Appl. No.: 14/190,608

(22) Filed: Feb. 26, 2014

(65) Prior Publication Data

US 2015/0244971 A1  Aug. 27, 2015

(51) Int. Cl.
| | |
|---|---|
| *H04N 5/76* | (2006.01) |
| *H04N 5/91* | (2006.01) |
| *H04N 5/85* | (2006.01) |
| *H04N 21/231* | (2011.01) |
| *H04N 21/4335* | (2011.01) |

(52) U.S. Cl.
CPC . *H04N 5/91* (2013.01); *H04N 5/85* (2013.01); *H04N 21/23113* (2013.01); *H04N 21/4335* (2013.01)

(58) Field of Classification Search
CPC ............ G11B 2020/10851; G11B 20/10; H04N 21/4532; H04N 21/4147; H04N 21/47214; H04N 21/4828; H04N 21/4882; H04N 21/44222; H04N 5/782; H04N 5/85
See application file for complete search history.

(56) References Cited

U.S. PATENT DOCUMENTS

| | | |
|---|---|---|
| 4,264,924 A | 4/1981 | Freeman |
| 4,264,925 A | 4/1981 | Freeman et al. |
| 4,355,415 A | 10/1982 | George et al. |
| 4,573,072 A | 2/1986 | Freeman |
| 4,602,279 A | 7/1986 | Freeman |
| 4,605,964 A | 8/1986 | Chard |

(Continued)

FOREIGN PATENT DOCUMENTS

| | | |
|---|---|---|
| CN | 1501711 | 6/2004 |
| DE | 4440419 | 5/1996 |

(Continued)

OTHER PUBLICATIONS

"Advanced Analog Systems—Addressable Terminals" General Instrument Corp. of Horsham, Pennsylvania (URL:http//www.gi.com/BUSAREA/ANALOG/TERMINAL/WATCH/watch.html) Printed from the Internet on Mar. 4, 1999.

(Continued)

*Primary Examiner* — Huy T Nguyen
(74) *Attorney, Agent, or Firm* — Ropes & Gray LLP

(57) ABSTRACT

Systems and methods for managing storage space of media assets stored on a storage device are described. In some embodiments, control circuitry determines whether a selected media asset belongs to a series where an order is assigned to media assets in the series. In response to determining that the selected media asset belongs to the series, the control circuitry retrieves information regarding a last viewed media asset of the series. The control circuitry determines whether the last viewed media asset is subsequent to the selected media asset in the order assigned to media assets in the series. In response to determining that the last viewed media asset is subsequent to the selected media asset in the order assigned to the media assets in the series, the control circuitry transmits an instruction to remove the selected media asset from the storage device.

20 Claims, 7 Drawing Sheets

(56) References Cited

U.S. PATENT DOCUMENTS

| | | |
|---|---|---|
| 4,694,490 A | 9/1987 | Harvey et al. |
| 4,706,121 A | 11/1987 | Young |
| 4,718,107 A | 1/1988 | Hayes |
| 4,847,698 A | 7/1989 | Freeman |
| 4,847,700 A | 7/1989 | Freeman |
| 4,857,999 A | 8/1989 | Welsh |
| 4,908,707 A | 3/1990 | Kinghorn |
| 4,930,158 A | 5/1990 | Vogel |
| 4,945,563 A | 7/1990 | Horton et al. |
| 4,959,720 A | 9/1990 | Duffield et al. |
| 4,977,455 A | 12/1990 | Young |
| 5,038,211 A | 8/1991 | Hallenbeck |
| 5,047,867 A | 9/1991 | Strubbe et al. |
| 5,068,733 A | 11/1991 | Bennett |
| 5,109,279 A | 4/1992 | Ando |
| 5,151,789 A | 9/1992 | Young |
| 5,172,413 A | 12/1992 | Bradley et al. |
| 5,187,589 A | 2/1993 | Kono et al. |
| 5,195,134 A | 3/1993 | Inoue et al. |
| 5,200,822 A | 4/1993 | Bronfin et al. |
| 5,210,611 A | 5/1993 | Yee et al. |
| 5,223,924 A | 6/1993 | Strubbe |
| RE34,340 E | 8/1993 | Freeman |
| 5,241,428 A | 8/1993 | Goldwasser et al. |
| 5,253,066 A | 10/1993 | Vogel |
| 5,285,284 A | 2/1994 | Takashima et al. |
| 5,296,931 A | 3/1994 | Na et al. |
| 5,323,234 A | 6/1994 | Kawasaki |
| 5,335,277 A | 8/1994 | Harvey et al. |
| 5,345,430 A | 9/1994 | Moe |
| 5,353,121 A | 10/1994 | Young et al. |
| 5,371,551 A | 12/1994 | Logan et al. |
| 5,410,344 A | 4/1995 | Graves et al. |
| 5,412,720 A | 5/1995 | Hoarty |
| 5,416,508 A | 5/1995 | Sakuma et al. |
| 5,442,389 A | 8/1995 | Blahut et al. |
| 5,459,522 A | 10/1995 | Pint |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,485,219 A | 1/1996 | Woo et al. |
| 5,517,257 A | 5/1996 | Dunn et al. |
| 5,524,195 A | 6/1996 | Clanton, III et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,550,576 A | 8/1996 | Klosterman |
| 5,559,548 A | 9/1996 | Davis et al. |
| 5,559,549 A | 9/1996 | Hendricks et al. |
| 5,568,272 A | 10/1996 | Levine |
| 5,583,561 A | 12/1996 | Baker et al. |
| 5,583,563 A | 12/1996 | Wanderscheid et al. |
| 5,583,653 A | 12/1996 | Timmermans et al. |
| 5,585,838 A | 12/1996 | Lawler et al. |
| 5,585,858 A | 12/1996 | Harper et al. |
| 5,589,892 A | 12/1996 | Knee et al. |
| 5,592,551 A | 1/1997 | Lett et al. |
| 5,600,364 A | 2/1997 | Hendricks et al. |
| 5,602,582 A | 2/1997 | Wanderscheid et al. |
| 5,619,274 A | 4/1997 | Roop et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,648,824 A | 7/1997 | Dunn et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,414 A | 8/1997 | Lett et al. |
| 5,659,367 A | 8/1997 | Yuen |
| 5,666,645 A | 9/1997 | Thomas et al. |
| 5,684,525 A | 11/1997 | Klosterman |
| 5,694,163 A | 12/1997 | Harrison |
| 5,694,381 A | 12/1997 | Sako |
| 5,699,107 A | 12/1997 | Lawler et al. |
| 5,717,452 A | 2/1998 | Janin et al. |
| 5,724,091 A | 3/1998 | Freeman et al. |
| 5,727,060 A | 3/1998 | Young |
| 5,732,216 A | 3/1998 | Logan et al. |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,758,257 A | 5/1998 | Herz et al. |
| 5,760,821 A | 6/1998 | Ellis et al. |
| 5,768,528 A | 6/1998 | Stumm |
| 5,778,182 A | 7/1998 | Cathey et al. |
| 5,781,226 A | 7/1998 | Sheehan |
| 5,781,246 A | 7/1998 | Alten et al. |
| 5,790,198 A | 8/1998 | Roop et al. |
| 5,790,202 A | 8/1998 | Kummer et al. |
| 5,796,952 A | 8/1998 | Davis et al. |
| 5,801,787 A | 9/1998 | Schein et al. |
| 5,802,284 A | 9/1998 | Karlton et al. |
| 5,805,155 A | 9/1998 | Allibhoy et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,812,937 A | 9/1998 | Takahisa et al. |
| 5,818,438 A | 10/1998 | Howe et al. |
| 5,819,019 A | 10/1998 | Nelson |
| 5,819,156 A | 10/1998 | Belmont |
| 5,822,123 A | 10/1998 | Davis et al. |
| 5,828,945 A | 10/1998 | Klosterman |
| 5,838,314 A | 11/1998 | Neel et al. |
| 5,850,218 A | 12/1998 | LaJoie et al. |
| 5,900,867 A | 5/1999 | Schindler et al. |
| 5,940,572 A | 8/1999 | Balaban et al. |
| 5,945,988 A | 8/1999 | Williams et al. |
| 5,959,592 A | 9/1999 | Petruzzelli |
| 5,963,264 A | 10/1999 | Jackson |
| 5,963,645 A | 10/1999 | Kigawa et al. |
| 5,970,486 A | 10/1999 | Yoshida et al. |
| 5,973,683 A | 10/1999 | Cragun et al. |
| 5,977,964 A | 11/1999 | Williams et al. |
| 5,987,213 A | 11/1999 | Mankovitz et al. |
| 5,991,498 A | 11/1999 | Young |
| 5,991,799 A | 11/1999 | Yen et al. |
| 5,995,155 A | 11/1999 | Schindler et al. |
| 6,002,394 A | 12/1999 | Schein et al. |
| 6,005,561 A | 12/1999 | Hawkins et al. |
| 6,005,597 A | 12/1999 | Barrett et al. |
| 6,005,631 A | 12/1999 | Anderson et al. |
| 6,014,184 A | 1/2000 | Knee et al. |
| 6,020,880 A | 2/2000 | Naimpally |
| 6,020,883 A | 2/2000 | Herz et al. |
| 6,038,367 A | 3/2000 | Abecassis |
| 6,057,872 A | 5/2000 | Candelore |
| 6,057,890 A | 5/2000 | Virden et al. |
| 6,075,526 A | 6/2000 | Rothmuller |
| 6,091,884 A | 7/2000 | Yuen et al. |
| RE36,801 E | 8/2000 | Logan et al. |
| 6,130,726 A | 10/2000 | Darbee et al. |
| 6,133,910 A | 10/2000 | Stinebruner |
| 6,141,488 A | 10/2000 | Knudson et al. |
| 6,157,413 A | 12/2000 | Hanafee et al. |
| 6,163,316 A | 12/2000 | Killian |
| 6,172,674 B1 | 1/2001 | Etheredge |
| 6,177,931 B1 | 1/2001 | Alexander et al. |
| 6,208,335 B1 | 3/2001 | Gordon et al. |
| 6,208,799 B1 | 3/2001 | Marsh et al. |
| 6,233,389 B1 | 5/2001 | Barton et al. |
| 6,275,648 B1 | 8/2001 | Knudson et al. |
| 6,317,882 B1 | 11/2001 | Robbins |
| 6,324,338 B1 | 11/2001 | Wood et al. |
| 6,326,982 B1 | 12/2001 | Wu et al. |
| 6,327,418 B1 | 12/2001 | Barton |
| 6,442,332 B1 | 8/2002 | Knudson et al. |

(56) References Cited

U.S. PATENT DOCUMENTS

| | | |
|---|---|---|
| 6,473,559 B1 | 10/2002 | Knudson et al. |
| 6,486,892 B1 | 11/2002 | Stern |
| 6,505,348 B1 | 1/2003 | Knowles et al. |
| 6,564,005 B1 | 5/2003 | Berstis |
| 6,564,383 B1 | 5/2003 | Combs et al. |
| 6,601,074 B1 | 7/2003 | Liebenow |
| 6,611,842 B1 | 8/2003 | Brown |
| 6,670,971 B1 | 12/2003 | Oral et al. |
| 6,721,954 B1 | 4/2004 | Nickum |
| 6,727,914 B1 | 4/2004 | Gutta |
| 6,744,967 B2 | 6/2004 | Kaminski et al. |
| 6,760,537 B2 | 7/2004 | Mankovitz |
| 6,766,100 B1 | 7/2004 | Komar et al. |
| 6,837,789 B2 | 1/2005 | Garahi et al. |
| 6,865,746 B1 | 3/2005 | Herrington et al. |
| 6,934,964 B1 | 8/2005 | Schaffer et al. |
| 6,950,624 B2 | 9/2005 | Kim et al. |
| 6,973,621 B2 | 12/2005 | Sie et al. |
| 6,987,945 B2 | 1/2006 | Corn et al. |
| 7,088,910 B2 | 8/2006 | Potrebic et al. |
| 7,096,486 B1 | 8/2006 | Ukai et al. |
| 7,185,355 B1 | 2/2007 | Ellis et al. |
| 7,353,270 B2 | 4/2008 | Kumar et al. |
| 7,412,714 B2 | 8/2008 | Kitayama |
| 7,519,268 B2 | 4/2009 | Juen et al. |
| 7,617,127 B2 | 11/2009 | Hunt et al. |
| 2001/0042128 A1 | 11/2001 | Hirayama |
| 2002/0056087 A1 | 5/2002 | Berezowski et al. |
| 2002/0059599 A1 | 5/2002 | Schein et al. |
| 2002/0129368 A1 | 9/2002 | Schlack et al. |
| 2002/0133817 A1 | 9/2002 | Markel |
| 2002/0144262 A1 | 10/2002 | Plotnick et al. |
| 2002/0174424 A1 | 11/2002 | Chang et al. |
| 2002/0174430 A1 | 11/2002 | Ellis et al. |
| 2002/0191954 A1 | 12/2002 | Beach et al. |
| 2002/0194596 A1 | 12/2002 | Srivastava |
| 2003/0005445 A1 | 1/2003 | Schein et al. |
| 2003/0009766 A1 | 1/2003 | Marolda |
| 2003/0014755 A1 | 1/2003 | Williams |
| 2003/0061610 A1 | 3/2003 | Errico |
| 2003/0093329 A1 | 5/2003 | Gutta |
| 2003/0118323 A1 | 6/2003 | Ismail et al. |
| 2003/0149980 A1 | 8/2003 | Hassell et al. |
| 2003/0149988 A1 | 8/2003 | Ellis et al. |
| 2003/0167471 A1 | 9/2003 | Roth et al. |
| 2003/0190150 A1 | 10/2003 | Kawaskia et al. |
| 2003/0208763 A1 | 11/2003 | McElhatten |
| 2004/0049787 A1 | 3/2004 | Maissel et al. |
| 2004/0098744 A1 | 5/2004 | Gutta |
| 2004/0111748 A1 | 6/2004 | Bushey et al. |
| 2004/0111756 A1 | 6/2004 | Stuckman et al. |
| 2004/0117257 A1 | 6/2004 | Haberman et al. |
| 2004/0193483 A1 | 9/2004 | Wolan et al. |
| 2004/0229568 A1 | 11/2004 | Lowe et al. |
| 2004/0237102 A1 | 11/2004 | Konig et al. |
| 2005/0050578 A1 | 3/2005 | Ryal |
| 2005/0055715 A1 | 3/2005 | Minnick et al. |
| 2005/0120003 A1 | 6/2005 | Drury et al. |
| 2005/0120373 A1 | 6/2005 | Thomas et al. |
| 2005/0193414 A1 | 9/2005 | Horvitz et al. |
| 2005/0204388 A1 | 9/2005 | Knudson et al. |
| 2005/0229213 A1 | 10/2005 | Ellis et al. |
| 2005/0235316 A1 | 10/2005 | Taylor |
| 2005/0240962 A1 | 10/2005 | Cooper et al. |
| 2005/0240968 A1 | 10/2005 | Knudson et al. |
| 2005/0251827 A1 | 11/2005 | Ellis et al. |
| 2005/0265169 A1 | 12/2005 | Yoshimaru et al. |
| 2005/0273819 A1 | 12/2005 | Knudson et al. |
| 2006/0031883 A1 | 2/2006 | Ellis et al. |
| 2006/0075015 A1 | 4/2006 | Wu et al. |
| 2006/0117343 A1 | 6/2006 | Novak et al. |
| 2006/0136966 A1 | 6/2006 | Folk, II |
| 2006/0140584 A1 | 6/2006 | Ellis et al. |
| 2006/0173974 A1 | 8/2006 | Tang |
| 2006/0277191 A1 | 12/2006 | Badovinatz |
| 2007/0050824 A1 | 3/2007 | Royo et al. |
| 2007/0089128 A1 | 4/2007 | Makowski et al. |
| 2007/0118848 A1 | 5/2007 | Schwesinger |
| 2007/0127696 A1 | 6/2007 | White |
| 2007/0154163 A1 | 7/2007 | Cordray |
| 2007/0157220 A1 | 7/2007 | Cordray et al. |
| 2007/0157237 A1 | 7/2007 | Cordray et al. |
| 2007/0157247 A1 | 7/2007 | Cordray et al. |
| 2007/0157249 A1 | 7/2007 | Cordray et al. |
| 2007/0204308 A1 | 8/2007 | Nicholas et al. |
| 2008/0028064 A1 | 1/2008 | Goyal et al. |
| 2008/0195468 A1 | 8/2008 | Malik |
| 2008/0270417 A1 | 10/2008 | Roker |
| 2008/0279530 A1 | 11/2008 | Haruki |
| 2009/0077589 A1 | 3/2009 | Boyer et al. |
| 2010/0325679 A1 | 12/2010 | Ryal |
| 2014/0344289 A1* | 11/2014 | Berenson .............. G06F 1/3293 707/751 |
| 2015/0030310 A1* | 1/2015 | Nesbitt .............. H04N 21/4325 386/239 |

FOREIGN PATENT DOCUMENTS

| | | |
|---|---|---|
| EP | 0572090 | 12/1993 |
| EP | 0682452 | 11/1995 |
| EP | 0753964 | 1/1997 |
| EP | 0789488 | 8/1997 |
| EP | 0836320 | 4/1998 |
| EP | 0854645 | 7/1998 |
| EP | 0921682 | 6/1999 |
| EP | 0940983 | 9/1999 |
| EP | 1014715 | 6/2000 |
| EP | 1059749 | 12/2000 |
| EP | 0856847 | 11/2001 |
| EP | 1534014 | 5/2005 |
| GB | 2227622 | 8/1990 |
| GB | 2229595 | 9/1990 |
| GB | 2346251 | 8/2000 |
| JP | 8-130517 | 5/1996 |
| JP | 10-257400 | 9/1998 |
| JP | 11-261917 | 9/1999 |
| JP | 11-308561 | 11/1999 |
| JP | 2000-013708 | 1/2000 |
| JP | 2000-138886 | 5/2000 |
| JP | 2000-224533 | 8/2000 |
| JP | 2000-235546 | 8/2000 |
| JP | 2000-306314 | 11/2000 |
| JP | 2001-88372 | 4/2001 |
| JP | 2001-165669 | 6/2001 |
| JP | 2001-167522 | 6/2001 |
| JP | 2001-257950 | 9/2001 |
| JP | 2003-216531 | 7/2003 |
| JP | 2003-319308 | 11/2003 |
| JP | 2004-118483 | 4/2004 |
| JP | 200434-3520 | 12/2004 |
| JP | 2005-109532 | 4/2005 |
| JP | 2005-159579 | 6/2005 |
| JP | 2005-302117 | 10/2005 |
| JP | 2005-348153 | 12/2005 |
| WO | WO-88/04507 | 6/1988 |
| WO | WO-93/23957 | 11/1993 |
| WO | WO-94/14284 | 6/1994 |
| WO | WO-95/32587 | 11/1995 |
| WO | WO-96/26605 | 8/1996 |
| WO | WO-96/34491 | 10/1996 |
| WO | WO-96/36172 | 11/1996 |
| WO | WO-96/37075 | 11/1996 |
| WO | WO-96/41470 | 12/1996 |
| WO | WO-96/41478 | 12/1996 |
| WO | WO-97/13368 | 4/1997 |
| WO | WO-97/46943 | 12/1997 |
| WO | WO-97/47124 | 12/1997 |
| WO | WO-97/48230 | 12/1997 |
| WO | WO-97/49237 | 12/1997 |
| WO | WO-98/06219 | 2/1998 |
| WO | WO-98/17064 | 4/1998 |
| WO | WO-98/43183 | 10/1998 |
| WO | WO-99/03267 | 1/1999 |
| WO | WO-99/04561 | 1/1999 |

(56) References Cited

FOREIGN PATENT DOCUMENTS

| | | |
|---|---|---|
| WO | WO-99/35827 | 7/1999 |
| WO | WO-99/37045 | 7/1999 |
| WO | WO-99/45700 | 9/1999 |
| WO | WO-99/52279 | 10/1999 |
| WO | WO-99/60493 | 11/1999 |
| WO | WO-99/65237 | 12/1999 |
| WO | WO-9966725 | 12/1999 |
| WO | WO-00/04706 | 1/2000 |
| WO | WO-00/04709 | 1/2000 |
| WO | WO-00/07368 | 2/2000 |
| WO | WO-00/08850 | 2/2000 |
| WO | WO-00/08851 | 2/2000 |
| WO | WO-00/08852 | 2/2000 |
| WO | WO-00/11869 | 3/2000 |
| WO | WO-00/13416 | 3/2000 |
| WO | WO-00/16336 | 3/2000 |
| WO | WO-00/16548 | 3/2000 |
| WO | WO-00/28739 | 5/2000 |
| WO | WO-00/58833 | 10/2000 |
| WO | WO-00/58967 | 10/2000 |
| WO | WO-00/59214 | 10/2000 |
| WO | WO-00/59223 | 10/2000 |
| WO | WO-00/62298 | 10/2000 |
| WO | WO-00/62299 | 10/2000 |
| WO | WO-00/62533 | 10/2000 |
| WO | WO-00/67475 | 11/2000 |
| WO | WO-01/10128 | 2/2001 |
| WO | WO-01/11865 | 2/2001 |
| WO | WO-01/22729 | 3/2001 |
| WO | WO-01/46843 | 6/2001 |
| WO | WO-01/47238 | 6/2001 |
| WO | WO-01/47249 | 6/2001 |
| WO | WO-01/47257 | 6/2001 |
| WO | WO-01/47273 | 6/2001 |
| WO | WO-01/47279 | 6/2001 |
| WO | WO-01/76239 | 10/2001 |
| WO | WO-01/76248 | 10/2001 |
| WO | WO-01/84340 | 11/2001 |
| WO | WO-02/07433 | 1/2002 |
| WO | WO-02/42959 | 5/2002 |
| WO | WO-02/078317 | 10/2002 |
| WO | WO-2006/060157 | 6/2006 |

OTHER PUBLICATIONS

"Digital Video Broadcasting (DVB); DVB specification for data broadcasting", European Telecommunications Standards Institute, Draft EN 301 192 V1.2.1 (Jan. 1999).

"DIRECTV Digital Satellite Receiver—Operating Instructions," Sony Electronics Inc. (2001).

"DIRECTV Receiver—Owner's Manual," DIRECTV, Inc. (2002).

"DIRECTV Receiver with TiVo Digital Satellite Receiver/Recorder SAT-T60—Installation Guide," Sony Corporation (2000).

"DIRECTV Receiver with TiVo Installation Guide," Philips (2000).

"DIRECTV Receiver with TiVo Viewer's Guide" (1999, 2000).

"DishPro Satellite System—User's Guide," Dish Network (undated).

"Electronic Programme Guide (EPG); Protocol for a TV Guide using electronic data transmission" by European Telecommunication Standards Institute, May 1997, Valbonne, France, publication No. ETS 300 707.

"Fall 2001 TiVo Service Update with Dual Tuner!," TiVo Inc. (2001).

"PTV Recorder Setup Guide," Philips (2000).

"RCA Satellite Receiver User's Guide," Thomson Multimedia Inc. (2001).

"Rewind, Replay and unwind with new high-tech TV devices," by Lawrence J. Magid, LA Times. This document was printed from the Internet on Jun. 6, 1999 and bears a date of May 19, 1999.

"Start Here," Sony, TiVo and DIRECTV (undated).

"Windows 98 Feature Combines TV, Terminal and the Internet." New York Times, Aug. 18, 1998.

CNN Tech: Sonicblue revives ReplayTV, articles cnn.com, Sep. 10, 2001, retrieved from the internet http://articles.cnn.com/2001-09-10/tech/replay.tv.idg_1_replaytv-sonicblue-digital-video?_s=PM:TECH.

Hofmann, Neumann, Oberlies, and Schadwinkel, "Videotext Programmiert Videorecorder," Rundfunktechnische Mitteilungen, Nov.-Dec. 1982, pp. 254-257.

SONICblue Incorporated: ReplayTV 4000 User Guide 12.17, Chapter Five: Networking, Sep. 10, 2001; retrieved from the internet: http://www.digitalnetworksna.com/support/replaytv/dowloads/ReplayTV4000UserGuide.12.17.pdf.

TV Guide Online, TV Guide Spot, http://www.tvguide.com/spot, accessed Apr. 10, 2006.

User's Guide RCA Color TV with TV Plus + Guide, 1997.

\* cited by examiner

```
                                    700
702──<Media Asset>
704──<Title> Welcome to Republic City </Title>
706──<Series Number> 1 </Series Number>
708──<Series Title> The Legend of Korra </Series Title>
710──<Episode Number> 1 </Episode Number>
712──<Original Air Date> April 14, 2012 </Original Air Date>
714──<Production Code> 101 </Production Code>
     <Last Viewed> Yes </Last Viewed>
     </Media Asset>
```

FIG. 7

```
                                    800
802──<User Profile>
  804──<User Name> John Smith </User Name>
  806──<Series>
    808──<Series Title> The Legend of Korra </Series Title>
    810──<Last Viewed>
      812──<Series Number> 1 </Series Number>
      814──<Episode Number> 1 </Episode Number>
         </Last Viewed>
      </Series>
   </User Profile>
```

FIG. 8

SYSTEMS AND METHODS FOR MANAGING STORAGE SPACE

BACKGROUND

In conventional digital video recorder (DVR) and other media storage systems, a user typically has to select media for deletion if the storage system is running out of storage space. For example, the user may select for deletion an episode of a television program he has already viewed to free storage space. In another example, the user may select for deletion an older episode of a television program to free storage space for newer media. However, the user may be unsure which older episodes to keep and which to delete in case he needs to view one of the older episodes at a later time.

SUMMARY OF THE DISCLOSURE

Systems and methods for managing storage space of media assets stored on a storage device are described. A digital video recorder (DVR) or other media storage system may be equipped with control circuitry to intelligently aid a user in managing storage space of media assets on a storage device included in the DVR. For example, the control circuitry may determine that the storage device is running out of storage space and prompt the user to select one or more programs for deletion from the storage device.

In some embodiments, the control circuitry retrieves a viewing history for the user to aid in selecting media for deletion. The control circuitry may retrieve user preferences specifying one or more rules for managing storage on the storage device. For example, the user may have entered an expiration date for a television program stored on the storage device, e.g., when the user set a recording for the television program. The user may have input a future date or a number of days, weeks and/or months to specify the expiration date for the future program. In another example, the user may have specified that after viewing an episode of a particular series, episodes of the series older than the viewed episode may be deleted automatically. For example, the control circuitry may analyze the user's viewing history and determine that the user has viewed Series 1, Episode 3 of a television program stored on the storage device. The control circuitry may analyze the storage device and determine that Series 1, Episode 2 and Series 1, Episode 4 of the television program are also stored on the storage device. The control circuitry may prompt the user to (or automatically, e.g., based on user preferences) delete Series 1, Episode 2 of the television program because it is likely that the user is not going to view the episode. Series 1, Episode 2 may or may not have been viewed from the storage device. The user may have viewed Series 1, Episode 2 through another media source, read about the plot line, or otherwise decided to skip to viewing Series 1, Episode 3. The control circuitry may not delete Series 1, Episode 4 since it is newer than last viewed Series 1, Episode 3. By intelligently aiding the user in deciding what media to delete from the storage device, the systems and methods described alleviate the issue where the user may be unsure about which stored episodes to delete to free space on the storage device.

In some embodiments, the control circuitry determines a last viewed episode from the user's viewing history and compares metadata for the last viewed episode with metadata for a candidate episode selected for deletion. The control circuitry may retrieve the series number and episode number for the last viewed episode and the selected episode, respectively. Episodes for a television program are typically assigned an order in terms of series number and episode number. The episodes for the television program may optionally be assigned an order based on an air date and/or a production date. For example, the control circuitry may retrieve Series 1, Episode 3 for the last viewed episode and Series 1, Episode 2 for the selected episode. The control circuitry may compare the metadata for the episodes to determine whether the last viewed episode is subsequent to the selected episode in the series order. If the last viewed episode is subsequent to the selected episode in the series order, the control circuitry may remove the selected episode from the storage device since the user has viewed a later episode, i.e., the last viewed episode, and is likely not going to view the selected episode. In some embodiments, the control circuitry removes the selected episode based on one or more rules specified by the user and stored in his user preferences. For example, the user may have specified that after viewing an episode of a particular series, episodes of the series older than the viewed episode may be deleted automatically.

In some embodiments, the control circuitry determines a last viewed episode from the user's viewing history by retrieving episodes in the viewing history that belong to the series. For example, the control circuitry may retrieve episodes in the viewing history that belong to series "The Dead Zone." The control circuitry further retrieves metadata for each episode. For example, the control circuitry may retrieve metadata for each episode including a series number and an episode number. In this example, the retrieved metadata may indicate the episodes to be Series 1, Episode 22 and Series 2, Episode 1 and Series 2, Episode 2 of series "The Dead Zone." The control circuitry may determine that the episodes from Series 2 are subsequent to the episode from Series 1. Thereafter, the control circuitry may determine that Series 2, Episode 2 is subsequent to Series 2, Episode 1. Finally, the control circuitry may return Series 2, Episode 2 to be the last viewed episode in the series.

In some implementations, the systems and methods described herein provide for a system for managing storage space of media assets stored on a storage device. The system includes user input circuitry and storage circuitry configured to store media assets on a storage device. The system includes control circuitry that receives a selection of a media asset from user input circuitry. The control circuitry determines whether the selected media asset belongs to a series where an order is assigned to media assets in the series. In response to determining that the selected media asset belongs to the series, the control circuitry retrieves information regarding a last viewed media asset of the series. The control circuitry determines whether the last viewed media asset is subsequent to the selected media asset in an order assigned to media assets in the series. In response to determining that the last viewed media asset is subsequent to the selected media asset in the order assigned to media assets in the series, the control circuitry transmits an instruction to storage circuitry to remove the selected media asset from the storage device.

In some embodiments, the control circuitry receives an indication of insufficient storage space in the storage device. The control circuitry generates for display a prompt including the indication of insufficient storage space and an identifier for a series. The control circuitry receives a selection of the identifier.

In some embodiments, the control circuitry determines whether the selected media asset belongs to the series by analyzing metadata associated with the selected media asset. In some embodiments, the order assigned to the media assets in the series is based on an episode number, an air date, and/or a production date.

In some embodiments, the control circuitry retrieves the information regarding the last viewed media asset of the series by retrieving a viewing history for a user and determining the last viewed media asset of the series based on the viewing history. In some embodiments, the control circuitry determines the last viewed media asset of the series based on the viewing history by retrieving media assets in the viewing history that belong to the series. The control circuitry further retrieves a series number and an episode number for each retrieved media asset. The control circuitry further determines a greatest series number from the series numbers for the retrieved media assets select media assets from the retrieved media assets that are associated with the greatest series number. The control circuitry further determines the last viewed media asset having a greatest episode number from the selected media assets associated with the greatest series number.

In some embodiments, the control circuitry transmits an instruction to remove the last viewed media asset from the storage device in response to determining that that the last viewed media asset is not subsequent to the selected media asset in the order assigned to the media assets in the series. In some embodiments, the control circuitry transmits the instruction to remove the last viewed media asset based on one or more rules specified by the user and stored in his user preferences.

In some embodiments, in response to determining that the selected media asset does not belong to a series, the control circuitry generates for display a prompt including an option to remove the selected media asset. The control circuitry further receives a selection of the option from the user and, in response to receiving the selection from the user, transmits an instruction to remove the selected media asset from the storage device.

In some embodiments, the control circuitry generates for display an indication of the selected media asset being removed from the storage device. In some embodiments, the selected media asset is selected from the group consisting of broadcast media, on-demand media, pay-per-view media, recorded media, and Internet media.

In some aspects, the systems and methods described herein include a method, an apparatus, or non-transitory machine-readable media for managing storage space of media assets stored on a storage device configured to execute the functionality described above.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is an illustrative embodiment of media asset metadata in accordance with some embodiments of the disclosure;

FIG. 8 is an illustrative embodiment of user profile metadata in accordance with some embodiments of the disclosure;

DETAILED DESCRIPTION

Figure 1:
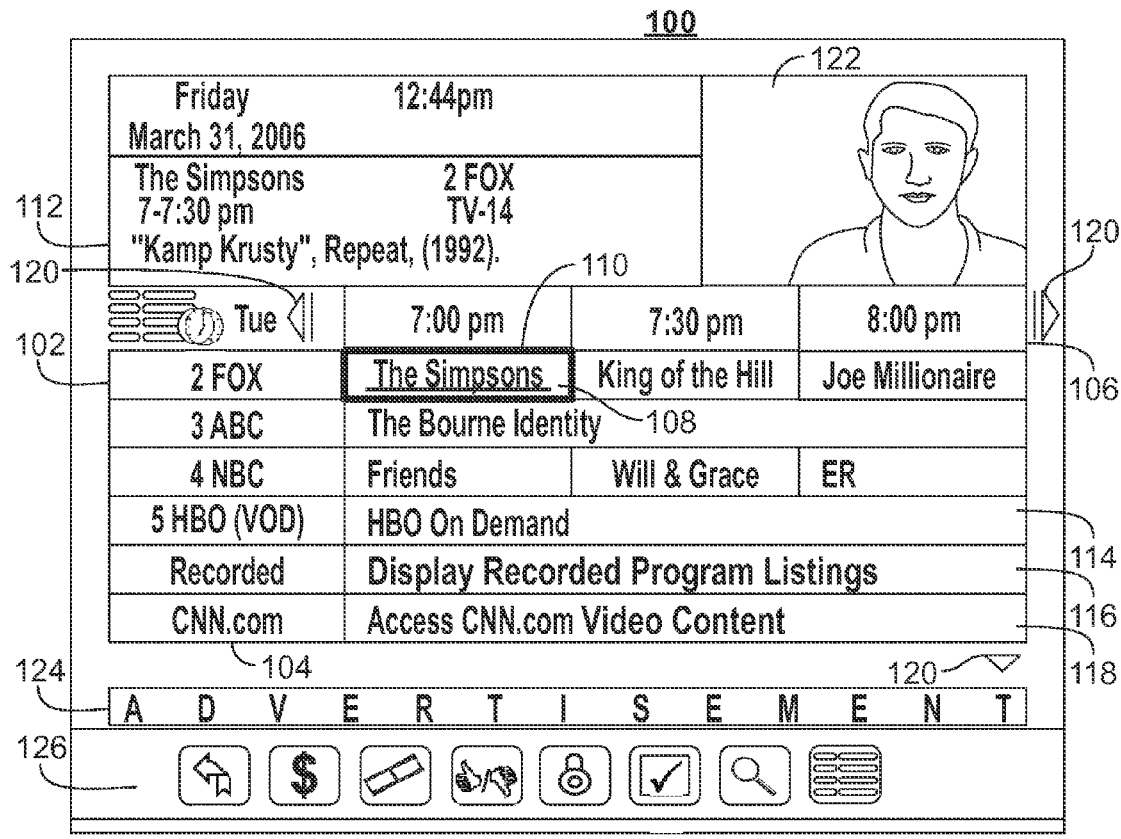
FIGS. 1 and 2 show illustrative display screens that may be used to provide media guidance application listings in accordance with some embodiments of the disclosure.

Systems and methods for managing storage space of media assets stored on a storage device are described. A digital video recorder (DVR) or other media storage system may be equipped with control circuitry to intelligently aid a user in managing storage space of media assets on a storage device included in the DVR. For example, the control circuitry may determine that the storage device is running out of storage space and prompt the user to select one or more programs for deletion from the storage device. An illustrative display screen is described with respect to FIG. 5.

In some embodiments, the control circuitry (e.g., control circuitry 304 in FIG. 3) retrieves a viewing history for the user to aid in selecting media for deletion. The control circuitry may also retrieve user preferences specifying one or more rules for managing storage on the storage device. For example, the user may have entered an expiration date for a television program stored on the storage device, e.g., when the user set a recording for the television program. The user may have input a future date or a number of days, weeks and/or months to specify the expiration date for the future program. In another example, the user may have specified that after viewing an episode of a particular series, episodes of the series older than the viewed episode may be deleted automatically. For example, the control circuitry may analyze the user's viewing history and determine that the user has viewed Series 1, Episode 3 of a television program stored on the storage device. An illustrative embodiment of user profile metadata including viewing history is described with respect to FIG. 8. The control circuitry may analyze the storage device and determine that Series 1, Episode 2 and Series 1, Episode 4 of the television program are also stored on the storage device. The control circuitry may prompt the user to (or automatically, e.g., based on user preferences) delete Series 1, Episode 2 of the television program because it is likely that the user is not going to view the episode. An illustrative display screen is described with respect to FIG. 6. Series 1, Episode 2 may or may not have been viewed from the storage device. The user may have viewed Series 1, Episode 2 through another media source, read about the plot line, or otherwise decided to skip to viewing Series 1, Episode 3. The control circuitry may not delete Series 1, Episode 4 since it is newer than last viewed Series 1, Episode 3. By intelligently aiding the user in deciding what media to delete from the storage device, the systems and methods described alleviate the issue where the user may be unsure about which stored episodes to delete to free space on the storage device.

In some embodiments, the control circuitry (e.g., control circuitry 304 in FIG. 3) determines a last viewed episode from the user's viewing history and compares metadata for the last viewed episode with metadata for a candidate episode selected for deletion. An illustrative embodiment of media asset metadata is described with respect to FIG. 7. The control circuitry may retrieve the series number and episode number for the last viewed episode and the selected episode, respectively. Episodes for a television program are typically assigned an order in terms of series number and episode number. The episodes for the television program may optionally be assigned an order based on an air date and/or a production date. For example, the control circuitry may retrieve Series 1, Episode 3 for the last viewed episode and Series 1, Episode 2 for the selected episode. The control circuitry may compare the metadata for the episodes to determine whether the last viewed episode is subsequent to the selected episode in the series order. If the last viewed episode is subsequent to the selected episode in the series order, the control circuitry may remove the selected episode from the storage device since the user has viewed a later episode, i.e., the last viewed episode, and is likely not going to view the selected episode. In some embodiments, the control circuitry may remove the selected episode based on one or more rules specified by the user and stored in his user preferences. For example, the user may have specified that after viewing an episode of a particular series, episodes of the series older than the viewed episode may be deleted automatically. Illustrative steps for managing storage space of media assets stored on a storage device are described with respect to FIGS. 9 and 10.

In some embodiments, the control circuitry determines a last viewed episode from the user's viewing history by retrieving episodes in the viewing history that belong to the series. For example, the control circuitry may retrieve episodes in the viewing history that belong to series "The Dead Zone." The control circuitry further retrieves metadata for each episode. For example, the control circuitry may retrieve metadata for each episode including a series number and an episode number. In this example, the retrieved metadata may indicate the episodes to be Series 1, Episode 22 and Series 2, Episode 1 and Series 2, Episode 2 of series "The Dead Zone." The control circuitry may determine that the episodes from Series 2 are subsequent to the episode from Series 1. Thereafter, the control circuitry may determine that Series 2, Episode 2 is subsequent to Series 2, Episode 1. Finally, the control circuitry may return Series 2, Episode 2 to be the last viewed episode in the series.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
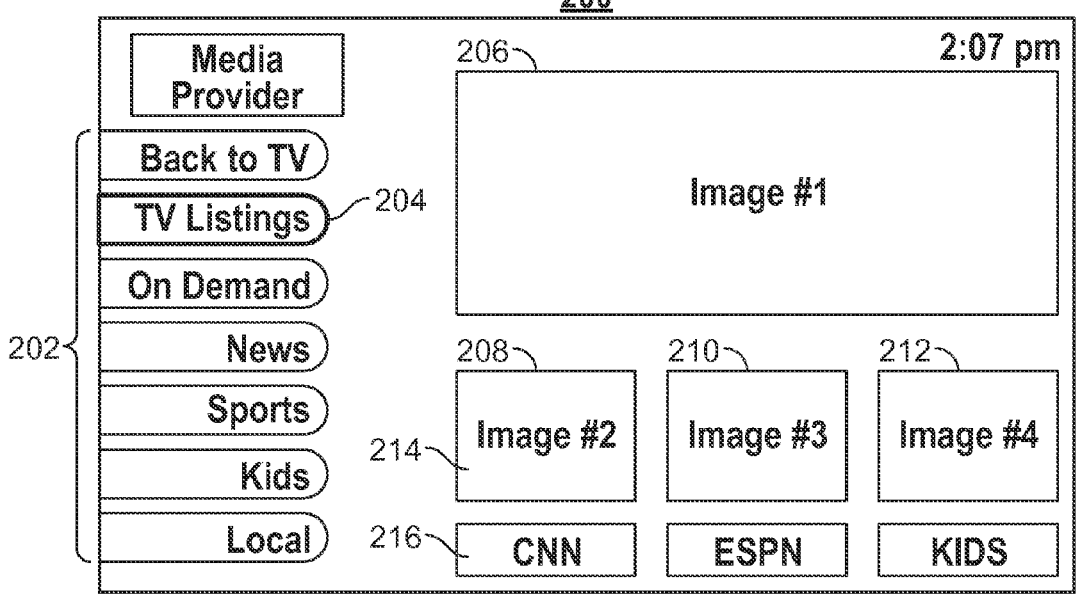

FIGS. 1-2 show illustrative display screens that may be used to provide media guidance data. The display screens shown in FIGS. 1-2 and 5-6 may be implemented on any suitable user equipment device or platform. While the displays of FIGS. 1-2 and 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
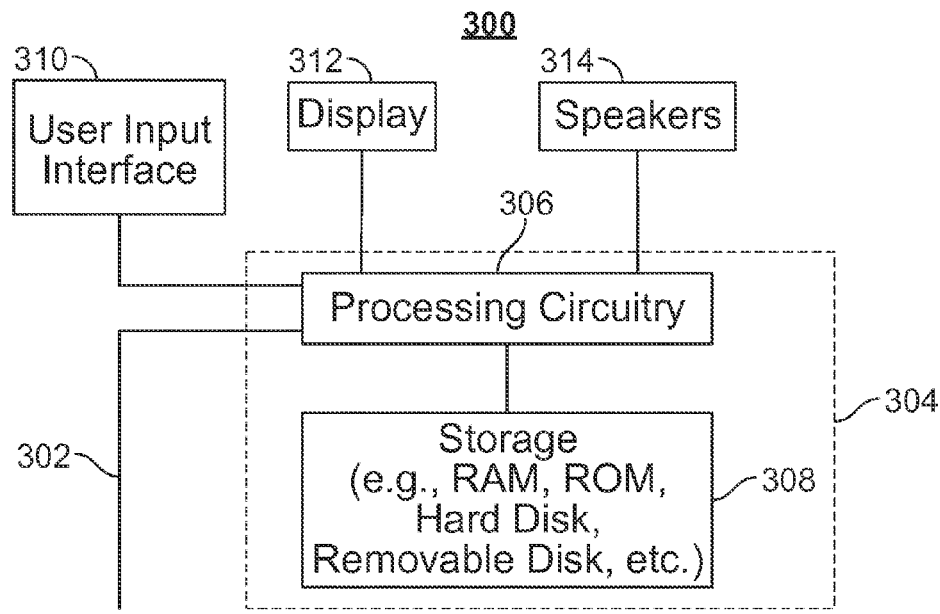
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
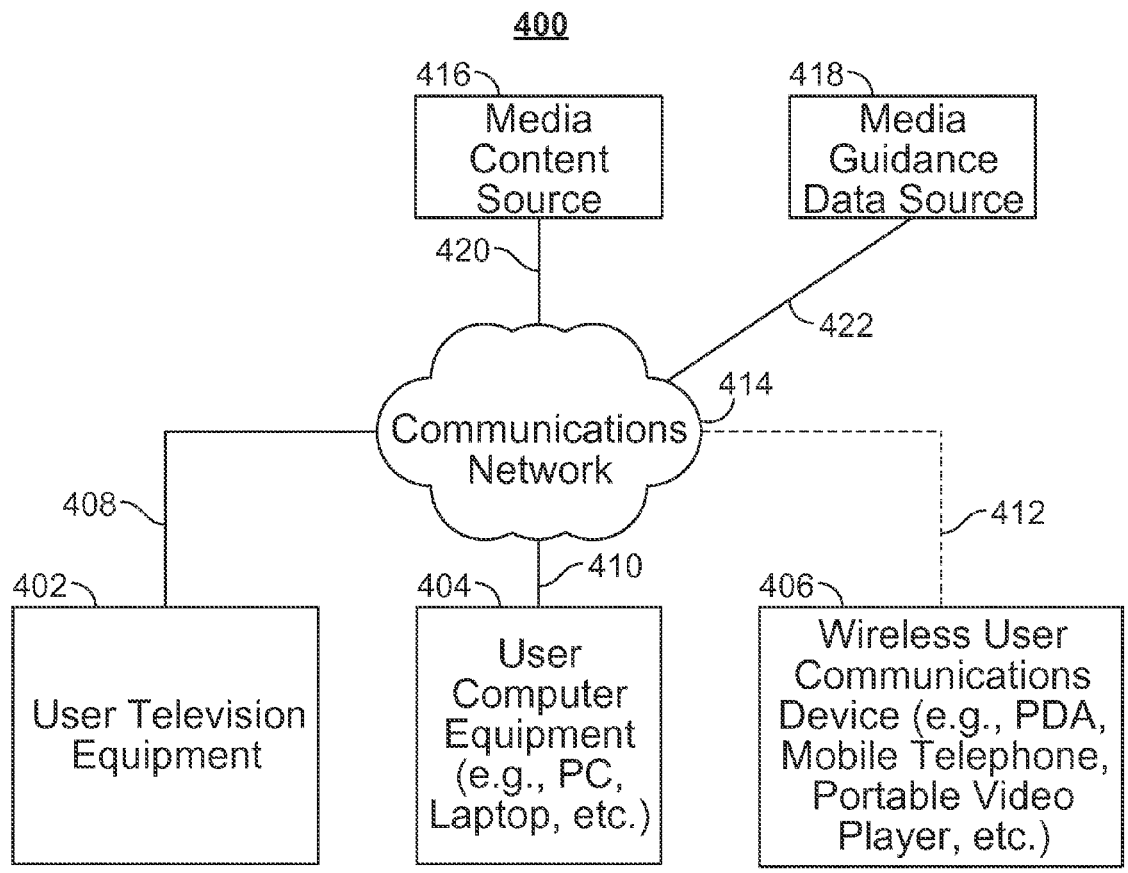
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application. In some embodiments, media guidance data source 418 provides user profile metadata and media asset metadata described with respect to FIGS. 7 and 8, respectively.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
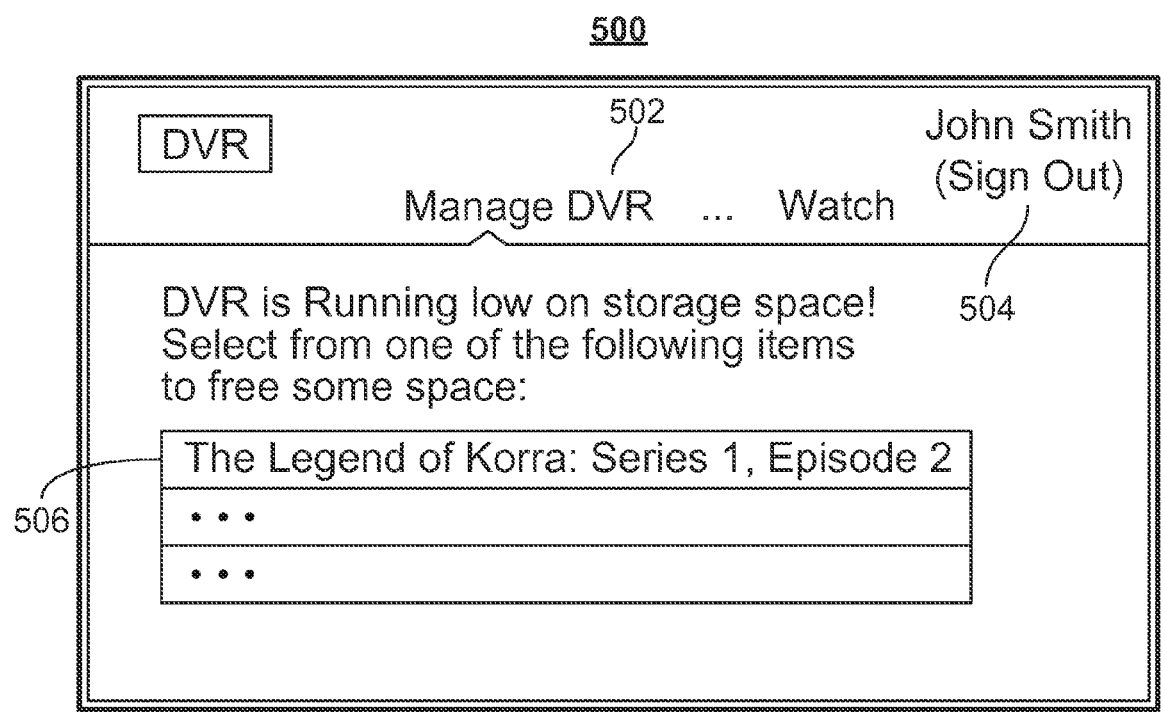
FIG. 5 is an illustrative display screen for managing storage space of media assets stored on a storage device in accordance with some embodiments of the disclosure.

FIG. 5 is an illustrative display screen 500 for managing storage space of media assets stored on a storage device in accordance with some embodiments of the disclosure. Display screen 500 including section 502 may be generated automatically or responsive to a request from the user. For example, display screen 500 may be generated automatically when the storage device is running low on storage space. Screen 500 further includes option 504 to sign out in case, e.g., the user realizes that he is not logged in to the correct account. This may be relevant to the user since control circuitry 304 generates items for option 506 to free storage space based on the user's viewing history.

For example, control circuitry 304 may include series "The Legend of Korra" in option 506. The user may select option 506 via user input interface 310. In another example, control circuitry 304 may include an episode of series "The Legend of Korra" in option 506. In some embodiments, control circuitry 304 retrieves a viewing history for the user to aid in selecting media for deletion. For example, control circuitry 304 may analyze the user's viewing history and determine that the user has viewed Series 1, Episode 3 of "The Legend of Korra" stored on the storage device. Control circuitry 304 may analyze the storage device and determine that Series 1, Episode 2 and Series 1, Episode 4 of the television program are also stored on the storage device. Control circuitry 304 may prompt the user to delete Series 1, Episode 2 of the "The Legend of Korra" because it is likely that the user is not going to view the episode. The user may viewed seen Series 1, Episode 2 through another media source, read about the plot line, or otherwise decided to skip to viewing Series 1, Episode 3. Control circuitry 304 may not delete Series 1, Episode 4 since it is newer than last viewed Series 1, Episode 3.

Figure 6:
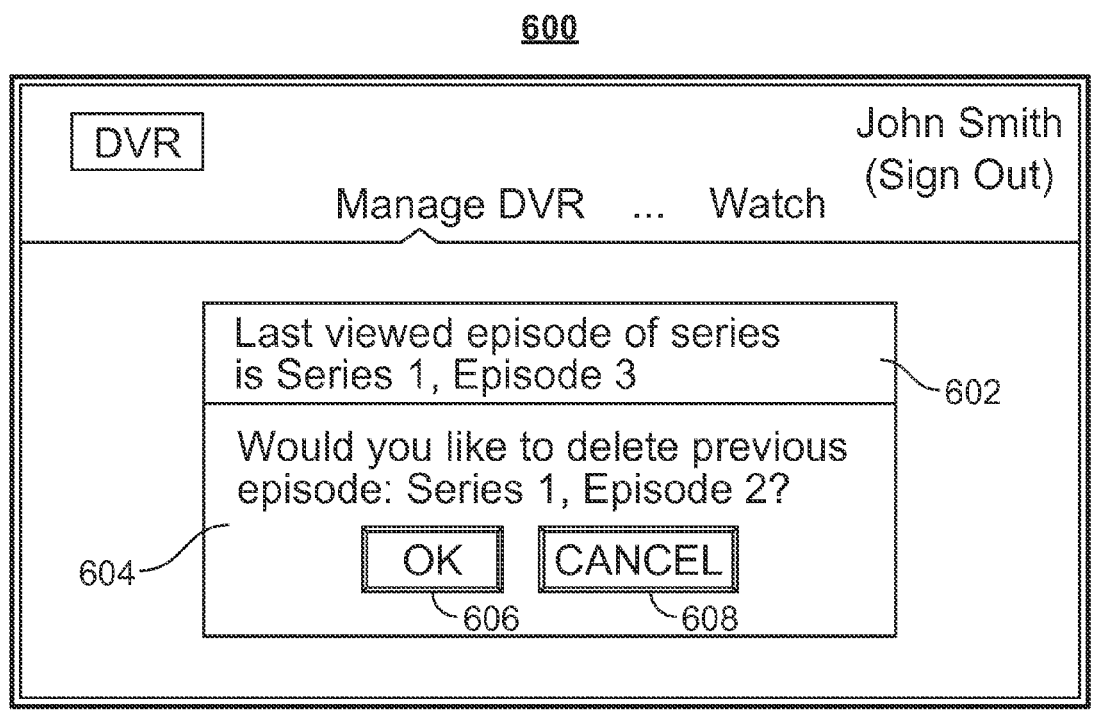
FIG. 6 is another illustrative display screen for managing storage space of media assets stored on a storage device in accordance with some embodiments of the disclosure.

FIG. 6 is another illustrative display screen for managing storage space of media assets stored on a storage device in accordance with some embodiments of the disclosure. Display screen 600 including sections 602 and 604 may be generated subsequent to selection of option 506 in display 500 (FIG. 5). In some embodiments, display screen 600 is generated automatically based on a certain event. Continuing from the example described with reference to FIG. 5, display screen 600 may be generated automatically when the user finishes viewing Series 1, Episode 3 of "The Legend of Korra." In some embodiments, display screen 600 is generated automatically based on a rule specified by the user and stored in his user preferences. The rule may specify that display screen 600 be generated when the user finishes viewing an episode of the "The Legend of Korra."

Control circuitry 304 may have analyzed the storage device and determined that Series 1, Episode 2 is also stored on the storage device. Control circuitry 304 may prompt the user to delete Series 1, Episode 2 of the "The Legend of Korra" because it is likely that the user is not going to view the episode. The user may have seen Series 1, Episode 2 through another media source, read about the plot line, or otherwise decided to skip to viewing Series 1, Episode 3. In some embodiments, the control circuitry removes the selected episode based on one or more rules specified by the user and stored in his user preferences. The user may select option 606 to delete the episode or select option 608 to ignore the prompt. The prompt may include a reason for the suggested deletion. In FIG. 6, the prompt includes information that the last viewed episode is Series 1, Episode 3. As such, the user may have already viewed Series 1, Episode 2 which has been suggested for deletion. In some embodiments, the prompt may include information regarding a rule that was used to suggest the episode deletion. For example, the prompt may include information that the expiration date set by the user for the episode has passed. In another example, the prompt may include information that the user has viewed the episode and that is the reason for suggesting it for deletion. In yet another example, the prompt may include information that the episode is an older one that has not been viewed even though the user has viewed the latest episode. By intelligently aiding the user in deciding what media to delete from the storage device, the systems and methods described alleviate the issue where the user may be unsure about which stored episodes to delete to free space on the storage device.

FIG. 7 is an illustrative embodiment of media asset metadata in accordance with some embodiments of the disclosure. Media asset metadata 700 may be retrieved from media guidance data source 418 or any other suitable device or location accessible via communication network 414 (FIG. 4). Media asset metadata 700 may be included in a media asset, kept as a separate file, or stored and/or retrieved in any other suitable manner. Media asset metadata 700 may include a plurality of fields.

In the illustrated embodiment, media asset metadata 700 includes fields 702-714. Fields 702-714 indicate information in media asset metadata 700 associated with a media asset. Particularly, field 702 indicates the media asset title, field 704 indicates the series number, field 706 indicated the series title, and field 708 indicates the episode number. Additionally, fields 710 and 712 indicate the original air date and production code for the media asset, respectively. Field 714 indicates whether this the last viewed asset in the series. Control circuitry 304 may automatically send an instruction to update field 714 as "Yes" after the user views the episode to indicate that it is the last viewed media asset in the series. Control circuitry 304 may send instructions to update field 714 as "No" for other media assets in the series to indicate that they are not the last viewed media assets in the series. In some embodiments, one or more of fields 702-714 are processed by control circuitry 304 (FIG. 3) to determine the last viewed media asset for the series. For example, fields 702-714 may indicate that the last viewed episode for series "The Legend of Korra" is Series 1, Episode 1.

Fields 702-714 include package indicators, e.g., <Media Asset> and </Media Asset>, to indicate the beginning and end of information associated with media asset metadata 700. In some embodiments, control circuitry 304 (FIG. 3) may use the package indicators to determine one or more information packages associated with the media asset. It should be noted that the information packages described herein are illustrative only and are not limiting. Additional information packages (or fewer information packages) may be used in accordance with this disclosure.

In some embodiments, media asset metadata 700 is retrieved by control circuitry 304 as described with reference to steps 1002 and 1010 in FIG. 10. Media asset metadata 700 may be stored on, or retrieved from, media guidance data source 418 or any other suitable device or location accessible via communication network 414.

FIG. 8 is an illustrative embodiment of user profile metadata 800 in accordance with some embodiments of the disclosure. User profile metadata 800 may be retrieved from media guidance data source 418 or any other suitable device or location accessible via communication network 414 (FIG. 4). User profile metadata 800 may be included in a database, kept as a separate file, or stored and/or retrieved in any other suitable manner. User profile metadata 800 may include a plurality of fields.

In the illustrated embodiment, user profile metadata 800 includes fields 802-814. Field 802 indicates the beginning of user profile information in user profile metadata 800 associated with a user, and field 804 indicates the user name "John Smith." Field 806 indicates the beginning of series information associated with user profile metadata 800. Fields 808-814 indicate information for series "The Legend of Korra." Particularly, field 808 indicates the series title and fields 812-814 indicate the last viewed episode 810 by series number 812 and episode number 814. In some embodiments, one or more of fields 808-814 are processed by control circuitry 304 (FIG. 3) to determine the last viewed media asset for the series. For example, fields 808-814 may indicate that the last viewed episode for series "The Legend of Korra" is Series 1, Episode 1. Control circuitry 304 may automatically send an instruction to update fields 812 and 814 with the series number and episode number of a media asset after the user views the media asset to indicate that it is the last viewed media asset in the series.

Fields 802-814 include package indicators, e.g., <User Profile> and </User Profile>, to indicate the beginning and end of information associated with user profile metadata 800. In some embodiments, control circuitry 304 (FIG. 3) may use the package indicators to determine one or more packages associated with the media asset. It should be noted that the information packages described herein are illustrative only and are not limiting. Additional information packages (or fewer information packages) may be used in accordance with this disclosure.

In some embodiments, user profile metadata 800 is retrieved by control circuitry 304 as described with reference to step 914 in FIG. 9. User profile metadata 800 may be stored on, or retrieved from, media guidance data source 418 or any other suitable device or location accessible via communication network 414.

Figure 9:
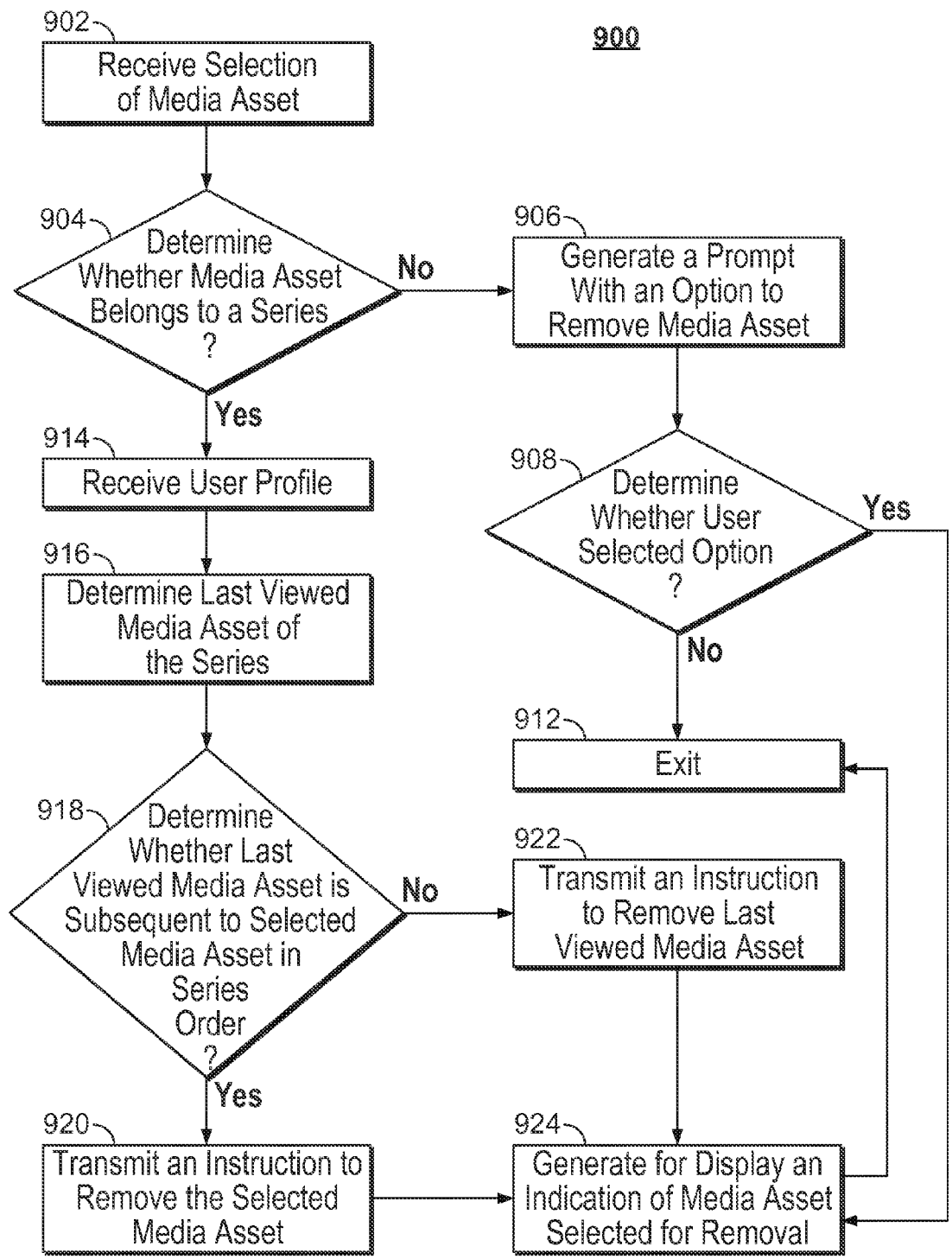
FIG. 9 is a flowchart of illustrative steps for managing storage space of media assets stored on a storage device in accordance with some embodiments of the disclosure.

FIG. 9 is a flowchart 900 of illustrative steps for managing storage space of media assets stored on a storage device in accordance with some embodiments of the disclosure. At step 902, control circuitry 304 receives a selection of a media asset. The selection may be received in accordance with the embodiments described in FIGS. 5 and 6, respectively. At step 904, control circuitry 304 determines whether the media asset belongs to a series. For example, circuitry 304 may retrieve media asset metadata 700 (FIG. 7) from media guidance data source 418 (FIG. 4) to determine that the media asset belongs to a series. If the media asset does not belong to a series, at step 906, control circuitry 304 optionally generates for display a prompt with an option to remove the media asset. At step 908, control circuitry 304 determines whether the user selected the option via user input interface 310. If the user did not select the option, at step 912, control circuitry 304 returns to a previous state before step 902 was initiated. For example, control circuitry 304 may transmit an instruction to generate display 500 (FIG. 5) for the user. If the user selected the option, at step 924, control circuitry 304 transmits an instruction to remove the media asset and generates for display an indication that the media asset has been selected for removal.

If the media asset belongs to a series, at step 914, control circuitry 304 receives a user profile for the user. The user profile may include user viewing history or preferences. An illustrative embodiment of user profile metadata is described with respect to FIG. 8. At step 916, control circuitry 304 analyzes the user's viewing history to determine the last viewed media asset of the series. In some embodiments, the user profile includes an indication of the last viewed episode for the series as described with respect to fields 810-814 in FIG. 8.

In some embodiments, control circuitry 304 determines a last viewed episode from the user's viewing history by retrieving episodes in the viewing history that belong to the series. For example, control circuitry 304 may retrieve episodes in the viewing history that belong to series "The Dead Zone." Control circuitry 304 further retrieves metadata for each episode. For example, control circuitry 304 may retrieve media asset metadata as described with respect to FIG. 7 from media guidance data source 418. Control circuitry 304 may retrieve metadata for each episode including a series number and an episode number. In this example, the retrieved metadata may indicate the episodes to be Series 1, Episode 22 and Series 2, Episode 1 and Series 2, Episode 2. Control circuitry 304 may determine that the episodes from Series 2 are subsequent to the episode from Series 1. Additionally, control circuitry 304 may determine that Series 2, Episode 2 is subsequent to Series 2, Episode 1. Finally, control circuitry 304 may return Series 2, Episode 2 to be the last viewed episode in the series.

At step 918, control circuitry 304 determines whether the last viewed media asset is subsequent to the selected media asset in the series order. In some embodiments, control circuitry 304 compares metadata for the last viewed episode with metadata for the selected media asset. For example, control circuitry 304 may retrieve the series number and episode number for the last viewed episode and the selected episode from their respective metadata. Episodes for a television program are typically assigned an order in terms of series number and episode number. The episodes for the television program may optionally be assigned an order based on an air date and/or a production date. For example, control circuitry 304 may retrieve Series 1, Episode 3 for the last viewed episode and Series 1, Episode 2 for the selected episode. Control circuitry 304 compares the metadata for the episodes to determine whether the last viewed episode is subsequent to the selected episode in the series order. Further illustrative steps for step 918 are described with respect to flowchart 1000 in FIG. 10.

If the last viewed media asset is subsequent to the selected media asset, at step 920, control circuitry 304 transmits an instruction to remove the selected media asset. For example, the last viewed media asset of Series 1, Episode 3 may be subsequent to the selected media asset of Series 1, Episode 2. Control circuitry 304 may remove the selected episode from the storage device since the user has seen a later episode, i.e., the last viewed episode, and is likely not going to view the selected episode. At step 924, control circuitry 304 generates for display an indication of the media asset selected for removal.

If the last viewed media asset is not subsequent to the selected media asset, at step 922, control circuitry 304 transmits an instruction to remove the last viewed media asset. For example, the last viewed media asset of Series 1, Episode 3 may not be subsequent to the selected media asset of Series 1, Episode 4. Control circuitry 304 may remove the last viewed episode from the storage device since the user has already seen this episode and will likely view the later episode, i.e., the selected episode, at a later time. At step 924, control circuitry 304 generates for display an indication of the media asset selected for removal.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure.

Figure 10:
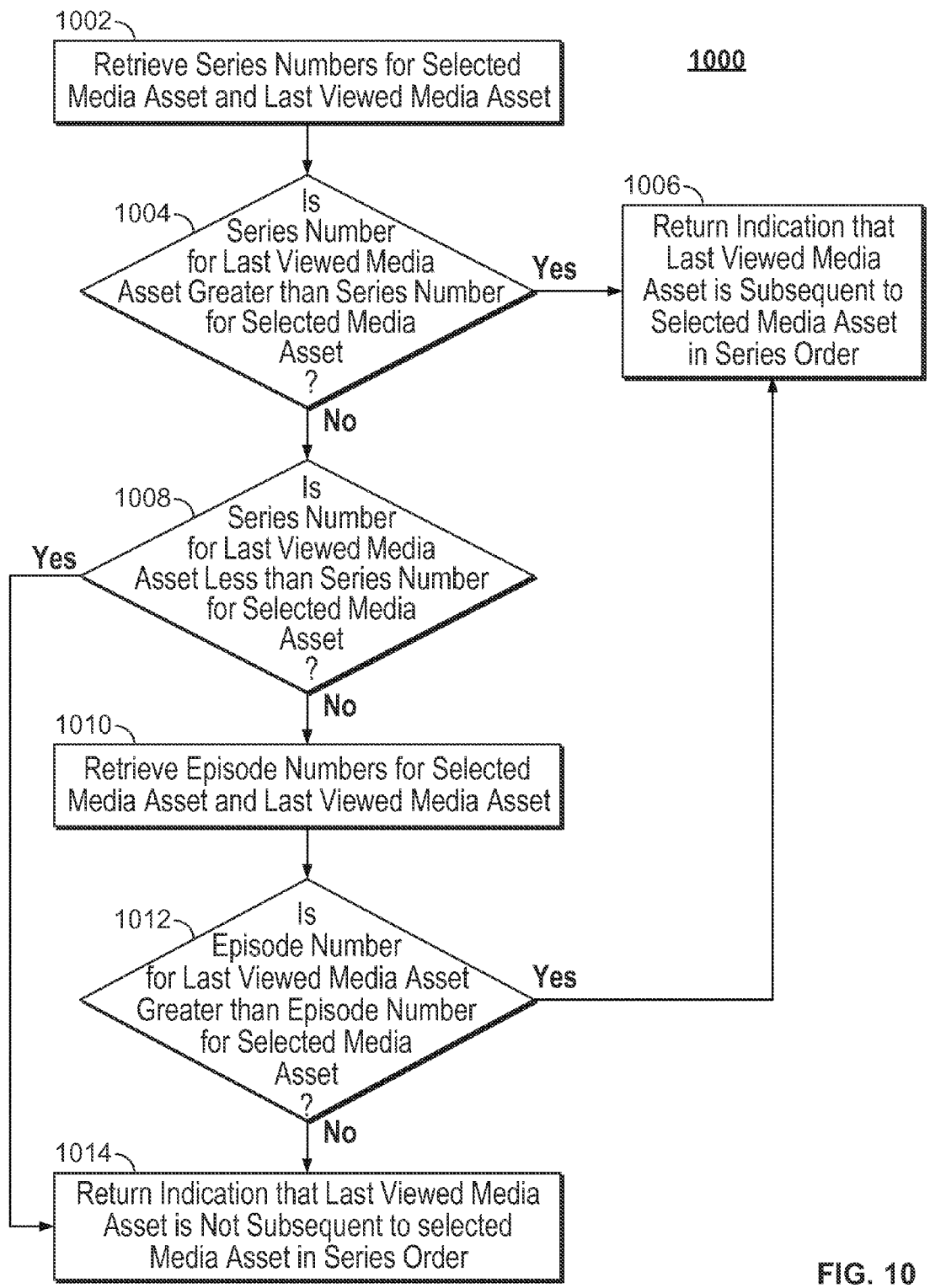
FIG. 10 is a flowchart of illustrative steps for determining whether a last viewed media asset is subsequent to a selected media asset in an order assigned to a series in accordance with some embodiments of the disclosure.

FIG. 10 is a flowchart 1000 of illustrative steps for determining whether a last viewed media asset is subsequent to a selected media asset in an order assigned to the series in accordance with some embodiments of the disclosure. As described with respect to step 918 in FIG. 9, flowchart 1000 describes further illustrative steps for step 918 to determine whether the last viewed media asset is subsequent to the selected media asset in the series order. At step 1002, control circuitry 304 retrieves the series number for the last viewed media asset and the selected media asset from their respective metadata. Episodes for a television program are typically assigned an order in terms of series number and episode number. The episodes for the television program may optionally be assigned an order based on an air date and/or a production date.

At step 1004, control circuitry 304 determines whether the series number for the last viewed media asset is greater than the series number for the selected media asset. If so, at step 1006, control circuitry 304 returns an indication that the last viewed media asset is subsequent to the selected media asset in the order assigned to the series. For example, control circuitry 304 may retrieve Series 2, Episode 1 for the last viewed episode and Series 1, Episode 1 for the selected episode. The series number 2 for the last viewed media asset is greater than the series number 1 for the selected media asset, i.e., the last viewed media asset is subsequent to the selected media asset in the order assigned to the series.

Otherwise, at step 1008, control circuitry 304 determines whether the series number for the last viewed media asset is less than the series number for the selected media asset. If so, at step 1014, control circuitry 304 returns an indication that the last viewed media asset is not subsequent to the selected media asset in the order assigned to the series. For example, control circuitry 304 may retrieve Series 1, Episode 1 for the last viewed episode and Series 2, Episode 1 for the selected episode. The series number 1 for the last viewed media asset is less than the series number 2 for the selected media asset, i.e., the last viewed media asset is not subsequent to the selected media asset in the order assigned to the series. Otherwise, at step 1010, control circuitry 304 retrieves episode numbers for the selected media asset and the last viewed media asset from their respective metadata.

At step 1012, control circuitry 304 determines whether the episode number for the last viewed media asset is greater than the episode number for the selected media asset. If so, at step 1006, control circuitry 304 returns an indication that the last viewed media asset is subsequent to the selected media asset in the order assigned to the series. For example, control circuitry 304 may retrieve Series 1, Episode 2 for the last viewed episode and Series 1, Episode 1 for the selected episode. The episode number 2 for the last viewed media asset is greater than the episode number 1 for the selected media asset, i.e., the last viewed media asset is subsequent to the selected media asset in the order assigned to the series.

Otherwise, at step 1014, control circuitry 304 returns an indication that the last viewed media asset is not subsequent to the selected media asset in the order assigned to the series. For example, control circuitry 304 may retrieve Series 1, Episode 1 for the last viewed episode and Series 1, Episode 2 for the selected episode. The episode number 1 for the last viewed media asset is less than the episode number 2 for the selected media asset, i.e., the last viewed media asset is not subsequent to the selected media asset in the order assigned to the series.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for managing storage space of media assets stored on a storage device, the method comprising:
   receiving a selection of a media asset;
   determining, using control circuitry, whether the selected media asset belongs to a series, wherein an order is assigned to media assets in the series;
   in response to determining that the selected media asset belongs to the series, retrieving information regarding a last viewed media asset of the series;
   determining, using the control circuitry, whether the last viewed media asset is subsequent to the selected media asset in the order assigned to media assets in the series; and
   in response to determining that the last viewed media asset is subsequent to the selected media asset in the order assigned to the media assets in the series, transmitting an instruction to remove the selected media asset from the storage device.

2. The method of claim 1, further comprising:
   receiving an indication of insufficient storage space in the storage device;
   generating for display a prompt including the indication of insufficient storage space and an identifier for a series; and
   receiving a selection of the identifier.

3. The method of claim 1, wherein determining whether the selected media asset belongs to the series comprises analyzing metadata associated with the selected media asset.

4. The method of claim 1, wherein the order assigned to the media assets in the series is based on at least one of an episode number, an air date, and a production date.

5. The method of claim 1, wherein retrieving the information regarding the last viewed media asset of the series comprises:
   retrieving a viewing history for a user; and
   determining, using the control circuitry, the last viewed media asset of the series based on the viewing history.

6. The method of claim 5, wherein determining the last viewed media asset of the series based on the viewing history comprises:
- retreiving media assets in the viewing history that belong to the series;
- retreiving a series number and an episode number for each retrieved media asset;
- determining a greatest series number from the series numbers for the retrieved media assets;
- selecting media assets from the retrieved media assets that are associated with the greatest series number; and
- determining the last viewed media asset having a greatest episode number from the selected media assets associated with the greatest series number.

7. The method of claim 1, further comprising:
- in response to determining that that the last viewed media asset is not subsequent to the selected media asset in the order assigned to the media assets in the series, transmitting an instruction to remove the last viewed media asset from the storage device.

8. The method of claim 1, further comprising:
- in response to determining that the selected media asset does not belong to a series, generating for display a prompt including an option to remove the selected media asset;
- receiving a selection of the option; and
- in response to receiving the selection, transmitting an instruction to remove the selected media asset from the storage device.

9. The method of claim 1, further comprising:
- generating for display an indication of the selected media asset being removed from the storage device.

10. The method of claim 1, wherein the selected media asset is selected from the group consisting of broadcast media, on-demand media, pay-per-view media, recorded media, and Internet media.

11. A system for managing storage space of media assets stored on a storage device, the system comprising:
- user input circuitry;
- storage circuitry configured to store media assets on a storage device;
- control circuitry configured to:
  - receive a selection of a media asset from the user input circuitry;
  - determine whether the selected media asset belongs to a series, wherein an order is assigned to media assets in the series;
  - in response to determining that the selected media asset belongs to the series, retrieve information regarding a last viewed media asset of the series from the storage circuitry;
  - determine whether the last viewed media asset is subsequent to the selected media asset in the order assigned to media assets in the series; and
  - in response to determining that the last viewed media asset is subsequent to the selected media asset in the order assigned to media assets in the series, transmit an instruction to the storage circuitry to remove the selected media asset from the storage device.

12. The system of claim 11, wherein the control circuitry is further configured to:
- receive an indication of insufficient storage space in the storage device;
- generate for display a prompt including the indication of insufficient storage space and an identifier for a series; and
- receive a selection of the identifier.

13. The system of claim 11, wherein the control circuitry configured to determine whether the selected media asset belongs to the series is further configured to analyze metadata associated with the selected media asset.

14. The system of claim 11, wherein the order assigned to the media assets in the series is based on at least one of an episode number, an air date, and a production date.

15. The system of claim 11, wherein the control circuitry configured to retrieve the information regarding the last viewed media asset of the series is further configured to:
- retrieve a viewing history for a user; and
- determine the last viewed media asset of the series based on the viewing history.

16. The system of claim 15, wherein the control circuitry configured to determine the last viewed media asset of the series based on the viewing history is further configured to:
- retrieve media assets in the viewing history that belong to the series;
- retrieve a series number and an episode number for each retrieved media asset;
- determine a greatest series number from the series numbers for the retrieved media assets;
- select media assets from the retrieved media assets that are associated with the greatest series number; and
- determine the last viewed media asset having a greatest episode number from the selected media assets associated with the greatest series number.

17. The system of claim 11, wherein the control circuitry is further configured to:
- in response to determining that that the last viewed media asset is not subsequent to the selected media asset in the order assigned to the media assets in the series, transmit an instruction to remove the last viewed media asset from the storage device.

18. The system of claim 11, wherein the control circuitry is further configured to:
- in response to determining that the selected media asset does not belong to a series, generate for display a prompt including an option to remove the selected media asset;
- receive a selection of the option; and
- in response to receiving the selection, transmit an instruction to remove the selected media asset from the storage device.

19. The system of claim 11, wherein the control circuitry is further configured to:
- generate for display an indication of the selected media asset being removed from the storage device.

20. The system of claim 11, wherein the selected media asset is selected from the group consisting of broadcast media, on-demand media, pay-per-view media, recorded media, and Internet media.

* * * * *